(12) United States Patent
Cambre

(10) Patent No.: US 8,978,291 B1
(45) Date of Patent: Mar. 17, 2015

(54) RAT POISON HOLDING AND DELIVERY CONTAINER

(76) Inventor: Michael M. Cambre, Mobile, AL (US)

( * ) Notice: Subject to any disclaimer, the term of this patent is extended or adjusted under 35 U.S.C. 154(b) by 196 days.

(21) Appl. No.: 13/587,337

(22) Filed: Aug. 16, 2012

(51) Int. Cl.
*A01M 25/00* (2006.01)

(52) U.S. Cl.
USPC .............................................. 43/131; 220/844

(58) Field of Classification Search
CPC .......................... A01M 25/002; A01M 25/004
USPC ............. 43/131; 220/844, 843, 836, 810, 676
See application file for complete search history.

(56) References Cited

U.S. PATENT DOCUMENTS

| | | | |
|---|---|---|---|
| 1,309,606 A | | 7/1919 | Bartholomew |
| 1,804,891 A | * | 5/1931 | Newman .......................... 43/131 |
| 1,820,186 A | * | 8/1931 | Gaskins .......................... 43/131 |
| 2,004,841 A | * | 6/1935 | Vinson .......................... 43/131 |
| 2,854,948 A | * | 10/1958 | Drayson ........................ 119/482 |
| 2,896,361 A | * | 7/1959 | Allen .............................. 43/131 |
| 2,944,364 A | | 7/1960 | Kelly |
| 3,045,387 A | * | 7/1962 | Simpson, Jr. ................... 43/131 |
| 3,343,744 A | * | 9/1967 | Morell et al. ................... 43/131 |
| 4,132,026 A | | 1/1979 | Dodds |
| 4,611,426 A | | 9/1986 | Willis |
| 5,448,852 A | | 9/1995 | Spragins et al. |
| 5,806,237 A | | 9/1998 | Nelson et al. |
| 6,014,834 A | * | 1/2000 | Ferland .......................... 43/131 |
| 6,338,317 B1 | * | 1/2002 | Smith ........................... 119/482 |
| D459,428 S | | 6/2002 | Johnson et al. |
| 6,588,141 B1 | | 7/2003 | Bergeson |
| 7,814,702 B2 | | 10/2010 | Nathan et al. |
| 8,028,468 B1 | | 10/2011 | Walsh et al. |

* cited by examiner

*Primary Examiner* — Darren W Ark
*Assistant Examiner* — Marc Burgess

(57) ABSTRACT

A rodent poison holding and delivery container includes a rear wall, a first lateral wall, a second lateral wall and a bottom wall. The first and second lateral have a terminal ends positioned opposite of the rear wall and which are positioned on opposite sides of a front opening extending into the housing. A cover is positioned on the rear wall, the first lateral wall and the second lateral wall. The cover closes an access opening extending through a top side of the housing. The cover is movable to expose the access opening. A panel is attached to the housing and covers the front opening. The panel is flexible and has a vertical slit therein extending upwardly from a lower edge of the panel. Rodent poison is positioned on the bottom wall and accessed by rodents through the front opening.

13 Claims, 3 Drawing Sheets

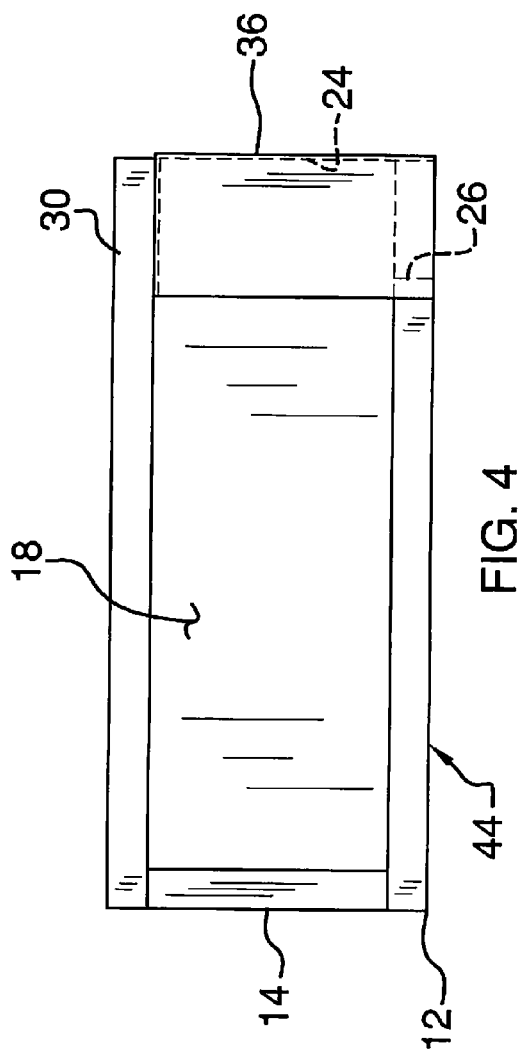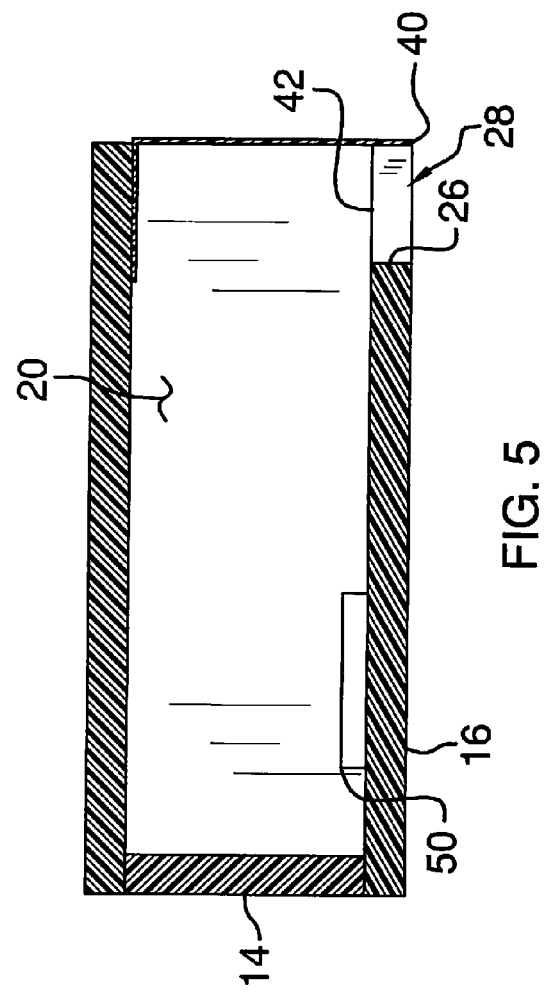

RAT POISON HOLDING AND DELIVERY CONTAINER

BACKGROUND OF THE DISCLOSURE

Field of the Disclosure

The disclosure relates to pest control poison holding devices and more particularly pertains to a new pest control poison holding device for delivering poison to a rodent while discouraging other animals from accessing the poison.

SUMMARY OF THE DISCLOSURE

An embodiment of the disclosure meets the needs presented above by generally comprising a housing including a rear wall, a first lateral wall and a second lateral wall. The first and second lateral walls are orientated parallel to each other. The first and second lateral walls each has a terminal end positioned opposite of the rear wall and equally spaced from the rear wall. The terminal ends are positioned on opposite sides of a front opening extending into the housing. A bottom wall is attached to and extends away from the rear wall. Each of the first and second lateral walls is attached to and extends upwardly from the bottom wall. A cover is positioned on the rear wall, the first lateral wall and the second lateral wall. The cover closes an access opening extending through a top side of the housing. The cover is movable to expose the access opening. A panel is attached to the housing and covers the front opening. The panel is flexible and has a vertical slit therein extending upwardly from a lower edge of the panel. Rodent poison is positioned on the bottom wall and accessed by rodents through the front opening.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a side view of an embodiment of the disclosure.
FIG. 5 is a cross-sectional view of an embodiment of the disclosure taken along line 5-5 of FIG. 1.

DESCRIPTION OF THE PREFERRED EMBODIMENT

Figure 1:
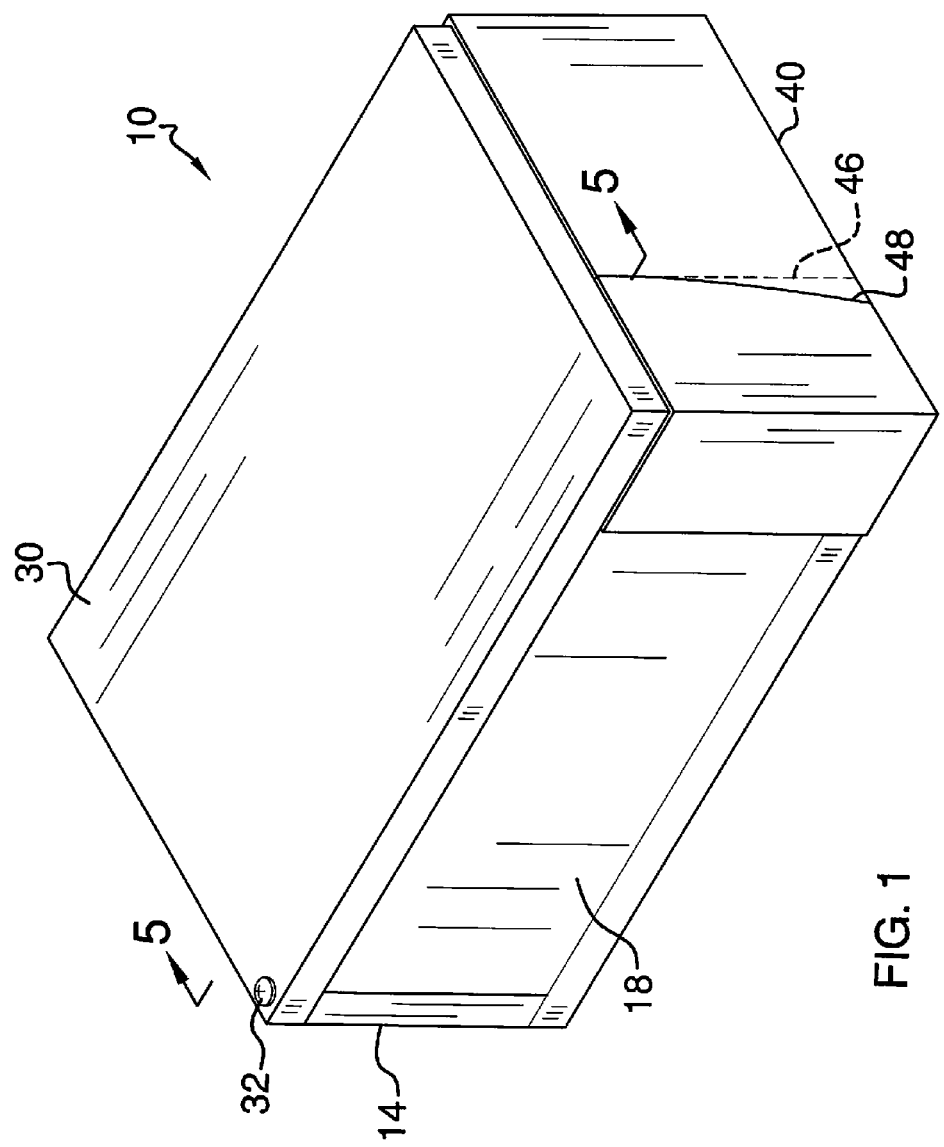
FIG. 1 is a front perspective view of a rodent poison holding and delivery container according to an embodiment of the disclosure.
Figure 2:
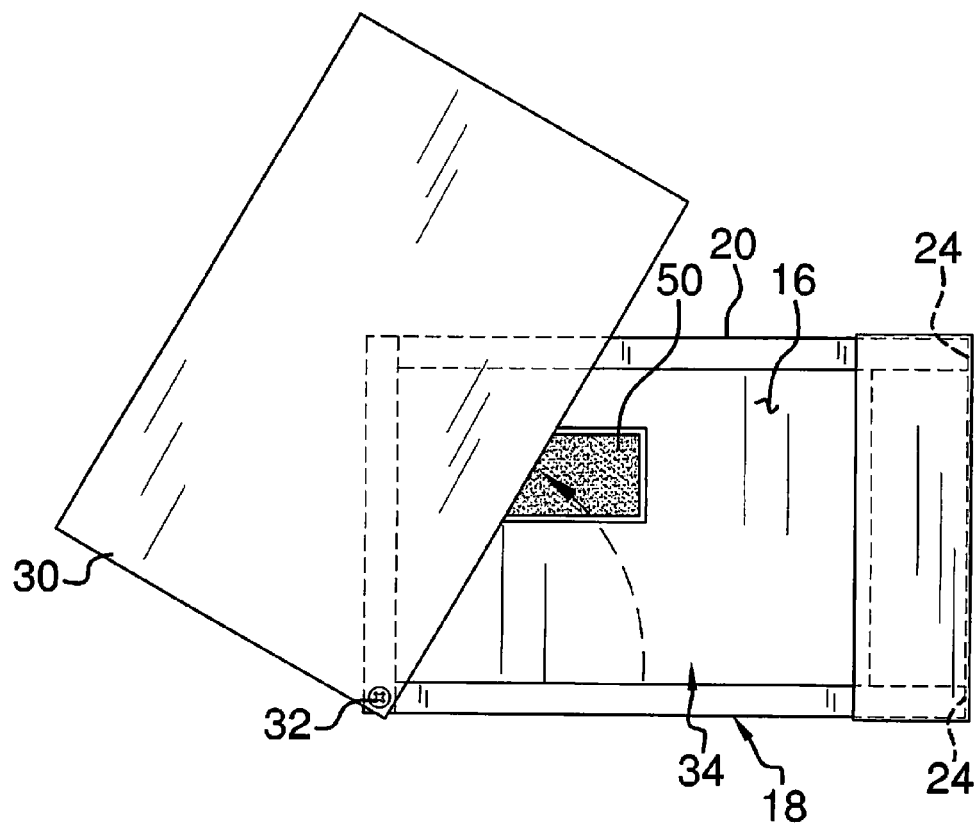
FIG. 2 is a top view of an embodiment of the disclosure.
Figure 3:
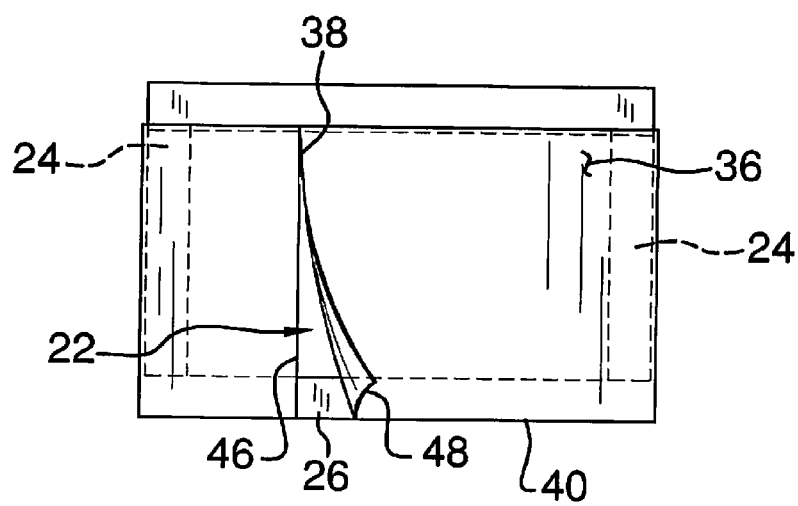
FIG. 3 is a front view of an embodiment of the disclosure.

With reference now to the drawings, and in particular to FIGS. 1 through 5 thereof, a new pest control poison holding device embodying the principles and concepts of an embodiment of the disclosure and generally designated by the reference numeral 10 will be described.

As best illustrated in FIGS. 1 through 5, the rodent poison holding and delivery container 10 generally comprises a housing 12 that includes a rear wall 14, a bottom wall 16, a first lateral wall 18, a second lateral wall 20 and a front opening 22. More particularly, the first lateral wall 18 and the second lateral wall 20 are each attached to and extend away from the rear wall 14. The first 18 and second 20 lateral walls are orientated parallel to each other and each has a terminal end 24 positioned opposite of the rear wall that are equally spaced from the rear wall 14. The terminal ends 24 are positioned on opposite sides of the front opening 22 extending into the housing 12. The housing 12 is devoid of a front wall. The bottom wall 16 is attached to and extends away from the rear wall 14 and each of the first 18 and second 20 lateral walls is attached to and extends upwardly from the bottom wall 16. The bottom wall 16 has front edge 26 positioned opposite of the rear wall 14. The front edge 26 is nearer to the rear wall 14 than the terminal ends 24 to define a bottom opening 28 extending into the housing 12 between the front edge 26 and the terminal ends 24. The housing 12 has a length from an outer surface of the rear wall 14 to the terminal ends 24 between 8.0 inches and 12.0 inches, an outer width from the first lateral wall 18 to the second lateral 20 wall between 3.0 inches and 7.0 inches, and a height between 2.0 inches and 5.0 inches. A distance from the terminal ends 24 to the front edge 26 is less than 5.0 inches.

A cover 30 is positioned on the rear wall 14, the first lateral wall 18 and the second lateral wall 20. The cover 30 closes an access opening 34 extending through a top side of the housing 12 and the cover 30 is movable to expose the access opening 34. The cover 30 may be pivotally coupled to the housing 12 with a pivot pin 32. Alternatively the cover 30 may be hingedly or snappily coupled to the housing 12.

A panel 36 is attached to the housing 12 and covers the front opening 22. The panel 36 is flexible and may be comprised of a plastic, fabric-like material. The panel 36 has a vertical slit 38 therein extending upwardly from a lower edge 40 of the panel 36. The panel 36 extends below a bottom edge 42 of the first 18 and second 20 lateral walls and has the lower edge 40 extending downwardly at least to a plane of a bottom side 44 of the bottom wall 16. The panel 36 extends around the lateral sides of the housing 12 to cover a gap formed under the first 18 and second 20 lateral walls between the terminal ends 24 and the front edge 26. The slit 38 defines a first flap 46 and a second flap 48 that are separable to provide access through the front opening 22. The first 46 and second 48 flaps overlap when the first 46 and second 48 flaps are in a closed position.

In use, the housing 12 is positioned in an area where rodents are expected or known to be. In particular, such an area would be adjacent to or abutting a dwelling as rodents often travel along the juncture of dwelling walls and a ground surface. Once in place, rodent poison 50 is placed on the bottom wall 16. The panel 36 encourages rodents, which typically burrow through small areas, to move through the slit 38 and into the housing 12. The space between the front edge 26 and the front opening 22 allows for easy movement of the panel 36 inward toward the housing 12. However, the size of the housing 12 and the panel 36 discourage non-burrowing animals such as birds and canines from attempting to enter the housing 12. In this way, the housing 12 facilitates the prevention of poisoning pets and birds.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A poison delivery assembly for holding and delivering rodent poison, said assembly comprising:
   a housing comprising a rear wall;
     a first lateral wall and a second lateral wall each being attached to and extending away from said rear wall, said first and second lateral walls being orientated parallel to each other, said first and second lateral walls each having a terminal end positioned opposite of said rear wall and equally spaced from said rear wall, said terminal ends being positioned on opposite sides of a front opening extending into said housing; and
     a bottom wall being attached to and extending away from said rear wall, each of said first and second lateral walls being attached to and extending upwardly from said bottom wall;
   a cover being positioned on said rear wall, said first lateral wall and said second lateral wall, said cover closes an access opening extending through a top side of said housing, said cover being movable to expose said access opening;
   a panel being attached to said housing and covering said front opening, said panel being flexible, said panel having a vertical slit therein extending upwardly from a lower edge of said panel; and
   wherein said bottom wall is configured to hold rodent poison, said bottom wall having a front edge positioned opposite of said rear wall, a full length of said front edge being nearer to said rear wall than said terminal ends are to said rear wall to define a bottom opening extending into said housing between said front edge and said terminal ends, said bottom opening extending between and to each of said first and second lateral walls.

2. The poison delivery assembly according to claim 1, wherein said cover is pivotally coupled to housing.

3. The poison delivery assembly according to claim 1, wherein said panel extends below a bottom edge of said first and second lateral walls and having said lower edge extending downwardly at least to a plane of a bottom side of said bottom wall, said slit defining a first flap and a second flap being separable to provide access through said front opening.

4. The poison delivery assembly according to claim 3, wherein said first and second flaps overlap when said first and second flaps are in a closed position.

5. The poison delivery assembly according to claim 1, wherein said first and second flaps overlap when said first and second flaps are in a closed position.

6. The poison delivery assembly according to claim 1, wherein said housing has a length from said rear wall to said terminal ends between 8.0 inches and 12.0 inches, a width from said first lateral wall to said second lateral wall between 3.0 inches and 7.0 inches, and a height between 2.0 inches and 5.0 inches.

7. A poison delivery assembly for holding and delivering rodent poison, said assembly comprising:
   a housing including a rear wall, a first lateral wall, a second lateral wall and a bottom wall, said first and second lateral walls each having a terminal end positioned opposite of said rear wall, said terminal ends being positioned on opposite sides of a front opening extending into said housing;
   a cover being positioned on said rear wall, said first lateral wall and said second lateral wall, said cover closes an access opening extending through a top side of said housing, said cover being movable to expose said access opening;
   a panel being attached to said housing and covering said front opening, said panel being flexible, said panel having a vertical slit therein extending upwardly from a lower edge of said panel; and
   wherein said bottom wall is configured to hold rodent poison, said bottom wall has front edge, a full length of said front edge being positioned between said rear wall and said terminal ends to define a bottom opening extending into said housing between said front edge and said terminal ends, said bottom opening extending between and to each of said first and second lateral walls.

8. The poison delivery assembly according to claim 7, wherein said cover is pivotally coupled to housing.

9. The poison delivery assembly according to claim 7, wherein said panel extends downward and said lower edge extends downwardly at least to a plane of a bottom side of said bottom wall, said slit defining a first flap and a second flap being separable to provide access through said front opening.

10. The poison delivery assembly according to claim 9, wherein said first and second flaps overlap when said first and second flaps are in a closed position.

11. The poison delivery assembly according to claim 7, wherein said first and second flaps overlap when said first and second flaps are in a closed position.

12. The poison delivery assembly according to claim 7, wherein said housing has a length from said rear wall to said terminal ends between 8.0 inches and 12.0 inches, a width from said first lateral wall to said second lateral wall between 3.0 inches and 7.0 inches, and a height between 2.0 inches and 5.0 inches.

13. A poison delivery assembly for holding and delivering rodent poison, said assembly comprising:
   a housing comprising a rear wall;
     a first lateral wall and a second lateral wall each being attached to and extending away from said rear wall, said first and second lateral walls being orientated parallel to each other, said first and second lateral walls each having a terminal end positioned opposite of said rear wall and equally spaced from said rear wall, said terminal ends being positioned on opposite sides of a front opening extending into said housing, and
     a bottom wall being attached to and extending away from said rear wall, each of said first and second lateral walls being attached to and extending upwardly from said bottom wall, said bottom wall having front edge positioned opposite of said rear wall, a full length of said front edge being nearer to said rear wall than said terminal ends are to said rear wall to define a bottom opening extending into said housing between said front edge and said terminal ends, said bottom opening extending between and to each of said first and second lateral walls a cover being positioned on said rear wall, said first lateral wall and said second lateral wall, said cover closing an access opening extending through a top side of said housing, said cover being movable to expose said access opening, said cover being pivotally coupled to housing;

a panel being attached to said housing and covering said front opening, said panel being flexible, said panel having a vertical slit therein extending upwardly from a lower edge of said panel, said panel extending below a bottom edge of said first and second lateral walls and having said lower edge extending downwardly at least to a plane of a bottom side of said bottom wall, said slit defining a first flap and a second flap being separable to provide access through said front opening, said first and second flaps overlapping when said first and second flaps are in a closed position;

said housing having a length from said rear wall to said terminal ends between 8.0 inches and 12.0 inches, a width from said first lateral wall to said second lateral wall between 3.0 inches and 7.0 inches, and a height between 2.0 inches and 5.0 inches, a distance from said terminal ends to said front edge being less than 5.0 inches; and wherein said bottom wall is configured to hold rodent poison.

* * * * *